(No Model.)
F. F. LANDIS.
GRAIN PAN FOR THRASHING MACHINES.
No. 454,365.  Patented June 16, 1891.
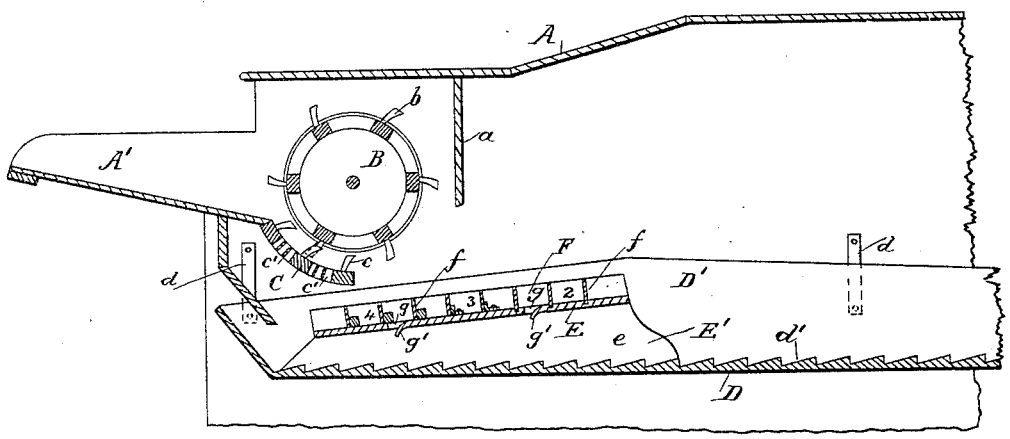
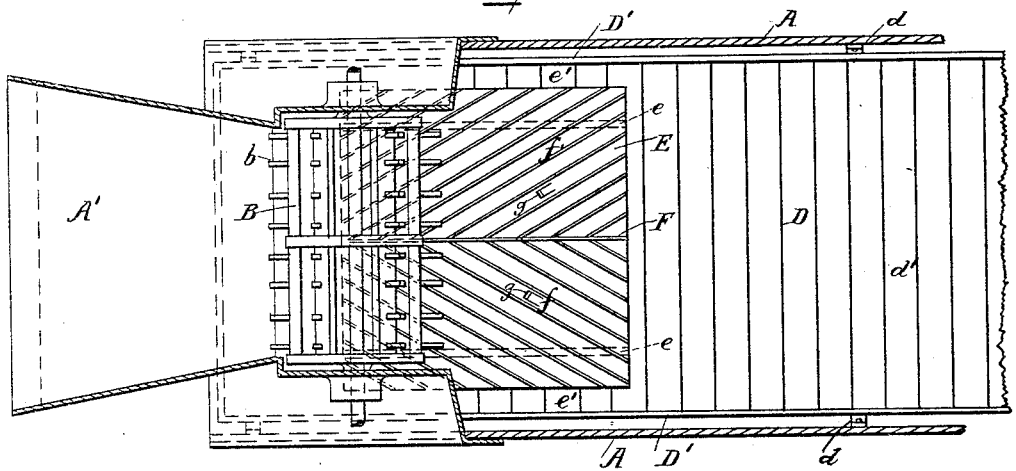
WITNESSES
Walter Allen
INVENTOR
Frank F. Landis.
by Herbert H. S. Jenner. Attorney

UNITED STATES PATENT OFFICE.

FRANK F. LANDIS, OF WAYNESBOROUGH, PENNSYLVANIA.

GRAIN-PAN FOR THRASHING-MACHINES.

SPECIFICATION forming part of Letters Patent No. 454,365, dated June 16, 1891.

Application filed March 16, 1891. Serial No. 385,158. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Grain-Pans for Thrashing-Machines; and I do hereby declare the following to be a full, clear, and exact description of the invention, such as will enable others skilled in the art to which it appertains to make and use the same.

This invention relates to the grain-pan under the cylinder and concave of a thrashing-machine; and it consists in the novel construction and combination of the parts hereinafter fully described and claimed for separating the grain from the straw and preventing the grain from rebounding in the pan and becoming entangled with the straw.

In the drawings, Figure 1 is a longitudinal section through the cylinder, concave, and grain-pan of a thrashing-machine; and Fig. 2 is a plan view of the same from above.

A is the casing of the machine.

B is the cylinder, provided with teeth $b$.

C is the concave, provided with teeth $c$ and open distance-pieces $c'$.

A' is the hopper from which the unthrashed sheaves are fed between the cylinder and the concave.

D is the reciprocating grain-pan, supported by the links $d$, pivoted to the casing and provided with a serrated bottom $d'$ for causing the grain to be traveled over its surface.

All the above parts may be of any approved form or construction, and the cylinder may be revolved and the grain-pan reciprocated in any convenient manner by any ordinary driving mechanism adapted for that purpose.

When a sheaf is thrust into the machine, the grain is immediately beaten out of the heads, which enter the machine in advance of the straw, the grain flies off in a shower into the grain-pan, and the straw passes under the partition $a$ and is taken up by the picker in the usual way.

Prior to this invention the thrashed grain has been partly separated from the straw by placing inclined slats across the grain-pan under the cylinder, the straw passed over the tops of the slats in a rearward direction, and the grain fell between the slats into the grain-pan. The separation, however, was imperfect, because much of the grain on striking the slats rebounded rearwardly and upwardly and became entangled with the straw of the preceding bunch of straw which had passed under the partition $a$. When the slats were placed at such an angle that the grain could not rebound upwardly and rearwardly, the slats prevented the straw from passing to the rear under the partition $a$ and caused the machine to become choked.

E is a plate supported on the longitudinal supports $e$ a short distance above the bottom of the grain-pan, a passage E' being left between the said plate and the bottom of the grain-pan. The plate E is preferably inclined upwardly and rearwardly; but this inclination is not an essential feature of the invention. Passages $e'$ are formed between the side edges of the plate E and the sides D' of the grain-pan, and an open space is left at the front of the plate for the grain to fall from the concave into the grain-pan.

F is a central longitudinal partition secured on top of the plate E in line with the central band on the cylinder, and $f$ are diverging ribs secured on top of the plate E on each side of the partition. The ribs diverge outwardly and rearwardly and are secured to the plate in any convenient manner. For instance, the ribs may be driven into grooves in the plate, as shown at 2. They may be secured by small angle-iron brackets and rivets, as shown at 3, or they may be secured by blocks, as shown at 4.

The ribs are preferably arranged to form an angle of thirty degrees with the central partition; but this angle may be increased or diminished as found to give the best results with different sorts of grain, and the ribs may be changed, adjusted, and set at different angles upon the plates as often as requisite. The ribs are preferably arranged to project at right angles to the plate E; but they may be inclined in either direction from an exact right angle, if desired, and the ribs are preferably of such height and are arranged at such distances apart from each other that all the grain which flies off from the cylinder must strike the ribs and not hit the bottom of the grain-pan on the plate E between the ribs, as that would cause the grain to rebound upwardly and rearwardly.

The plate E may have perforations $g$ in it, if desired, and tongues $g'$ to prevent straws from sticking in the perforations and clogging the machine. When the plate is provided with these perforations to allow the grain to pass through it, the tongues are preferably formed by punching or cutting the tongue from the plate and leaving it attached to the plate by its rear edge. The plate E is made of metal; but it may be made of wood, or it may be made partly of wood and partly of metal, as found convenient. The grain which falls into the front end of the grain-pan through the concave passes up the passage E', and the grain which strikes the diverging ribs rushes up the channels between the ribs and falls into the grain-pan through the passages $e'$ and over the rear edge of the plate E.

The plate E, with its diverging ribs, does not necessarily have to be secured to the grain-pan, as it may be supported in any other convenient manner between the cylinder and the grain-pan. The plate E may be omitted, if desired, as it is the diverging ribs which are the essential features of the invention. These ribs may be secured to the grain-pan direct when the plate E is omitted, or supported a short distance above its bottom. A small portion of the grain may strike the horizontal surface of the plate E, or the bottom of the pan when the plate E is omitted, close to the ribs; but provided that it strikes the ribs when it rebounds and is thereby projected forward, it will not be necessary to space the ribs so close together as to prevent the grain from striking the horizontal surface at all.

What I claim is—

1. The combination, with a grain-pan, of a plate secured above the bottom of the pan and forming passages between the side edges of the plate and the sides of the pan, said plate being provided with rearwardly-diverging ribs upon its upper surface for separating the grain from the straw.

2. The combination, with a grain-pan, of a plate secured above the said pan by longitudinal supports, leaving open passages between the plate and pan both at the bottom and at the sides, a central partition secured to the top of the plate, and rearwardly-diverging ribs secured to the plate on each side of the said partition, substantially as and for the purpose set forth.

3. The combination, with a thrashing-cylinder and its concave and a grain-pan below the said parts, of a series of rearwardly-diverging ribs arranged between the said thrashing devices and the bottom of the grain-pan, the said ribs being of such height and spaced at such distance apart that all the grain must strike against the substantially vertical sides of the ribs, and be thereby projected forward and prevented from rebounding upward and becoming entangled with the straw.

In testimony whereof I affix my signature in presence of two witnesses.

FRANK F. LANDIS.

Witnesses:
ALF N. RUSSELL,
D. B. RUSSELL.